United States Patent [19]

Suzuki

[11] Patent Number: 4,905,023

[45] Date of Patent: Feb. 27, 1990

[54] IMAGE FORMING APPARATUS INCLUDING DIGITAL IMAGE SIGNAL INPUT MEANS

[75] Inventor: Yoshiyuki Suzuki, Kawasaki, Japan

[73] Assignee: Canon Kabushiki Kaisha, Tokyo, Japan

[21] Appl. No.: 119,622

[22] Filed: Nov. 12, 1987

[30] Foreign Application Priority Data

Nov. 14, 1986 [JP] Japan ................. 61-269866

[51] Int. Cl.⁴ .............................................. G01D 9/42
[52] U.S. Cl. .................................. 346/108; 346/76 L;
346/160; 358/298
[58] Field of Search ................ 346/76 L, 108, 160,
346/107 R; 358/298, 287, 300, 302, 296

[56] References Cited

U.S. PATENT DOCUMENTS

| | | | |
|---|---|---|---|
| 4,198,154 | 4/1980 | Masegi | 355/5 |
| 4,361,394 | 11/1982 | Sakai | 355/8 |
| 4,387,983 | 6/1983 | Masegi | 355/8 |
| 4,476,474 | 10/1984 | Kitamura | 346/160 |
| 4,517,579 | 5/1985 | Kitamura | 346/160 |
| 4,558,328 | 12/1985 | Takanashi et al. | 346/76 PH |
| 4,585,332 | 4/1986 | Shenoy | |
| 4,677,493 | 6/1987 | Shinya | 358/298 |
| 4,709,250 | 11/1987 | Takeushi | 346/160 |
| 4,763,199 | 8/1988 | Suzuki | 358/280 |
| 4,782,398 | 11/1988 | Mita | 358/280 |
| 4,800,442 | 1/1989 | Riseman | 358/280 |
| 4,811,037 | 3/1989 | Arai | 346/108 |
| 4,819,066 | 4/1989 | Miyagi | 355/14 |
| 4,831,392 | 5/1989 | Dei | 364/519 |

FOREIGN PATENT DOCUMENTS

| | | |
|---|---|---|
| 0009777 | 1/1984 | European Pat. Off. |
| 3212194 | 10/1982 | Fed. Rep. of Germany |
| 3129109 | 12/1983 | Fed. Rep. of Germany |
| 3729936 | 3/1988 | Fed. Rep. of Germany |
| 56-081990 | 4/1981 | Japan |
| 0210471 | 10/1985 | Japan ................. 346/76 PH |
| 1525218 | 9/1978 | United Kingdom |
| 2006445 | 5/1979 | United Kingdom |
| 2096335 | 10/1982 | United Kingdom |
| 2170372 | 7/1986 | United Kingdom |
| 2178548 | 2/1987 | United Kingdom |

Primary Examiner—Teresa J. Walberg
Assistant Examiner—Huan Tran
Attorney, Agent, or Firm—Fitzpatrick Cella Harper & Scinto

[57] ABSTRACT

An image forming apparatus includes a digital image signal input, and image former for forming an image of predetermined elements on a recording medium by scanning a recording medium in response to the digital image signal in first and second scanning directions, and a corrector for correcting the size of the predetermined elements in different first or second modes in relation to the first and second directions. Also provided are a generator for generating a recording beam to irradiate the recording medium, and a modulator for modulating the recording beam in response to the digital image signal. The corrector corrects the intensity of the recording beam and the irradiation duration thereof. A converter converts characteristics of the digital image signal and outputs the converted digital image signal. The converter includes a plurality of tables employed to perform the conversion. A processor processes the outputted converted digital image signal and generates a pulse-width modulated signal on the basis of the level of the converted digital image signal. A discriminator discriminates whether the input digital image signal represents a thin line image or an edge image and selects one of the tables in accordance with the discrimination results.

19 Claims, 9 Drawing Sheets

|  | V₁ | V₂ |
|---|---|---|
| $\gamma_1$ | 0 | 0 |
| $\gamma_2$ | 1 | 0 |
| $\gamma_3$ | 1 | 1 |

IMAGE FORMING APPARATUS INCLUDING DIGITAL IMAGE SIGNAL INPUT MEANS

BACKGROUND OF THE INVENTION

1. Field of the Invention

The present invention relates to an image forming apparatus for forming an image on a recording medium such as a photosensitive member.

2. Related Background Art

The printers for electrophotographic image reproduction by turning on and off a laser beam according to image signals can be classified into two categories with respect to the correlation between the reproduced image and the on-off state of the laser beam.

The first category is image scan process printers, in which the laser beam is turned on at the positions of black pixels where the image is reproduced and is turned off at the positions of white pixels where the image is not reproduced. The second category is background scan process printers, in which the laser beam is turned off at the positions corresponding to black pixels and turned on at the positions of white pixels.

Figure 9:
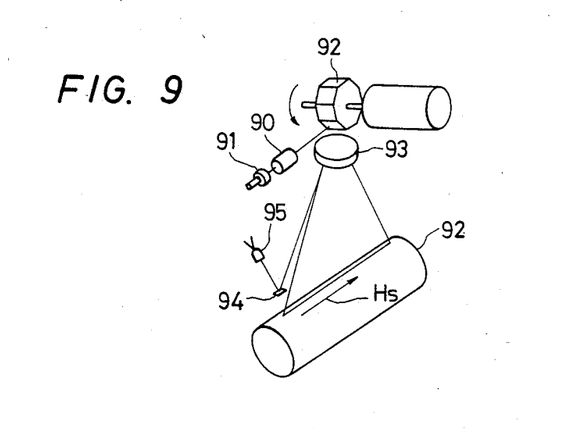
FIG. 9 is a schematic view of an image forming unit of a laser beam printer.

FIG. 9 illustrates an image forming unit of a laser beam printer, in which a laser unit 91 turns on and off a laser beam in response to image signals supplied thereto. The laser beam emitted therefrom is guided through a collimating lens 90, then reflected by a polygon mirror 92 rotated at a constant speed, and is focused on a photosensitive member 92 after an optical path correction by a correction optical system 93. Due to the illustrated rotation of the polygon mirror 92, each reflecting face of the mirror causes the laser beam to perform one scan of the photosensitive member 92 in a direction Hs. A two-dimensional scanning is achieved by the rotation of the photosensitive member 92 at a constant speed, thereby achieving image reproduction.

A part of the scanning beam is reflected by a mirror 94 and is subjected to photoelectric conversion in a photosensor 95 to generate a horizontal synchronization signal or a beam detection signal BD.

The images printed by such laser beam printer are predominantly document images including characters and symbols, in which the number of white pixels (an area) is generally much larger than that of black pixels. The cumulative turn-on time of the laser beam is therefore smaller in the image scan process in which the laser beam is turned on at the positions of black pixels, so that the image scan process is preferable to the background scan process in the case of using a semiconductor laser which is concerned about the service life of the laser source.

On the other hand, such image scan process often shows difficulty in the reproduction of so-called solid black image consisting of consecutive black pixels, since the non-uniformity in reflecting faces of the polygon mirror and the mechanical vibration result in a fluctuation in the pitch of scanning lines, thus giving rise to striped patterns in the image in the scanning direction.

On the other hand, the background scan process can reproduce uniform black image since the laser beam is not turned on at the positions of black pixels.

Figure 10A:
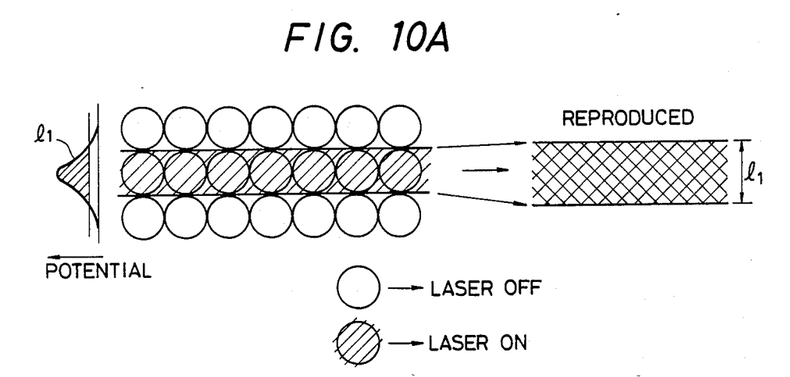
FIG. 10A and 10B are schematic views showing the principle of a thin line reproduction in the image scan process.
Figure 10B:
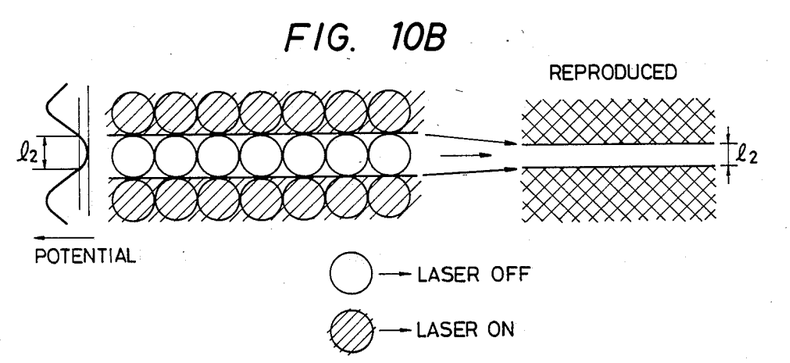

Also in the reproduction of a fine line of a width of about one pixel, the image scan process and the background scan process exhibit different behaviors. This is due to the fact that the laser beam spot focused on the photosensitive member has an approximately Gaussian two-dimensional energy distribution, and the development characteristic for visualization of a latent image formed on the photosensitive member by such laser beam spot. FIGS. 10A and 10B illustrate such fine line reproduction with the image scan process. In the reproduction of a black line of a width of one pixel as shown in FIG. 10A, the laser beam is turned off at the pixels represented by white circles, and is turned on at the pixels represented by black circles. The width $l_1$ of the reproduced image becomes wider because of the trailing energy distribution of the laser beam spot on the photosensitive member explained above and the electrophotographic development characteristics. On the other hand, a white line of a width of one scanning line becomes thinner due to same reason, as shown in FIG. 10B. Thus small characters and symbols become illegible. Such a tendency becomes more marked when the beam spot diameter and the development conditions are so selected that the neighboring scan lines mutually overlap in order to prevent the aforementioned unevenness in the solid black area caused by the errors in the scanning optical system and particularly a white line of the width of one scanning line becomes buried in the black areas and is not reproduced.

Figure 11A:
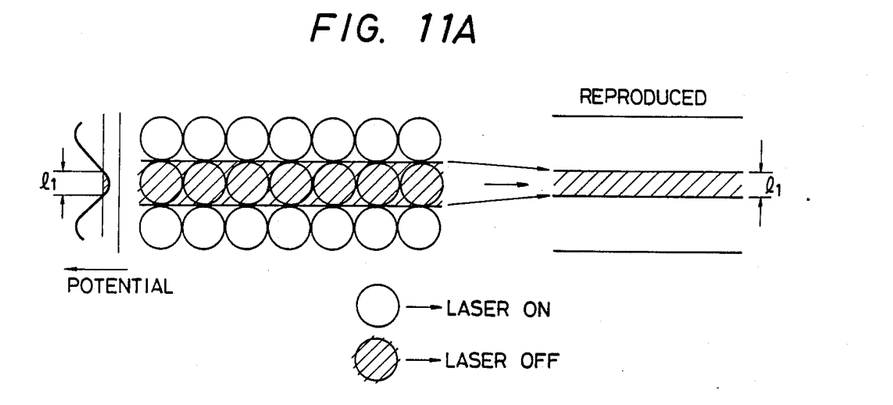
FIGS. 11A and 11B are schematic views showing the principle of a thin line reproduction in the background scan process.
Figure 11B:
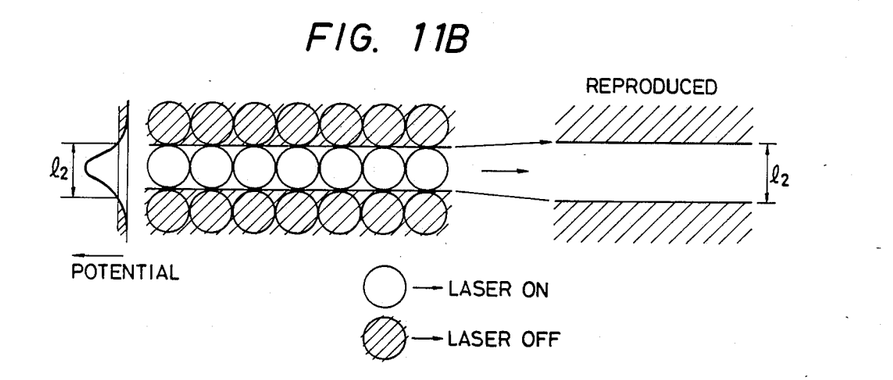

FIGS. 11A and 11B illustrate the case of the background scan process. Contrary to the image scan process, a black line as shown in FIG. 11A becomes thinner and a white line as shown in FIG. 11B becomes thicker. Consequently the letters and symbols are reproduced thinner, and, a thin line of a width of one scanning line cannot be reproduced at all depending on the beam spot diameter and the developing conditions because of the reasons explained above.

As explained above, the image scan process and the background scan process respectively have advantages and drawbacks.

On the other hand, the present applicant already proposed, for improving the reproducibility of intermediate tone images with a laser beam printer, a process of image reproduction by comparing an image signal having gradations with a periodical signal such as a triangular signal synchronized with the image signal, and generating a signal of a pulse width corresponding to the tone of the image signal thereby effecting pulse width modulation of the laser beam. In this process, the tonal rendition is not provided in the dot density itself but is obtained by varying the ratio of black area and white area per unit area, utilizing the human visual characteristics.

This process can be utilized for correcting the aforementioned pixel thinning or thickening, arising from the above-explained scanning process in the laser beam printer.

Figure 12:
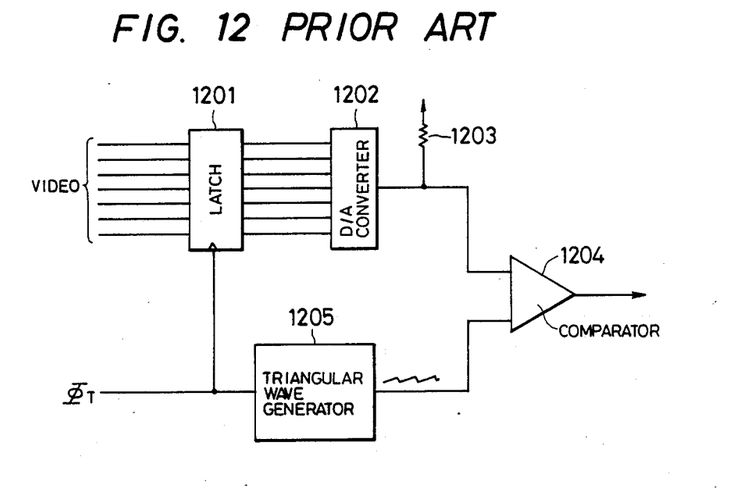
FIG. 12 is a schematic view showing the principle of a laser pulse width modulation circuit for tonal reproduction with a laser beam printer, previously proposed by the present applicant.

FIG. 12 shows the basic structure of the process. A digital image signal VIDEO with intermediate tone is synchronized with an image clock signal $\phi_T$, by a latch 1201, is then converted into a voltage corresponding to the image density level by a D/A converter 1202 and a resistor 1203, and is supplied to an input terminal of a comparator 1204.

On the other hand, a triangular wave synchronized with the image clock signal $\phi_T$ is generated by a triangular wave generator 1205 and is supplied to the other input terminal of the comparator 1204, which compares the triangular wave with the image signal converted into the voltage. Thus a binary signal of a pulse width corresponding to the level of the image signal can be obtained and is utilized to drive the laser, thereby enabling tonal image reproduction.

This process can be utilized for coping with the pixel thinning or thickening arising from the aforementioned scanning processes of the laser beam printer. More specifically, it is possible to examine the relation, in signal level, between a target pixel and neighboring pixels, and to change the modulation characteristics of the pulse width if said target pixel is identified as a part of a thin line. For example, in the image scan process in which a black thin line tends to be reproduced thicker, the pulse width for a pixel is made narrower if the pixel is identified as a part of a black thin line.

However, though this process can be effective for a thin line perpendicular to the beam scanning direction, it cannot be effective for a thin line parallel to the beam scanning direction.

Besides the present applicant already proposed various methods, in the U.S. Pat. Nos. 4,387,983, 4,517,579 and 4,476,474, for preventing image quality deterioration such as image thinning or thickening, but a satisfactory effect has not been attained.

Furthermore the copending U.S. Ser. No. 898,096 filed on Aug. 20, 1986 proposes a method of faithfully reproducing an intermediate tone image by varying the pulse width for turning on a beam as well as the beam intensity, but such method is still incapable of satisfactorily preventing the image quality deterioration as explained above.

Furthermore the copending U.S. Ser. No. 091,773 filed on Sept. 1, 1987 proposes to control the beam intensity by identifying the image characteristic, but a further improvement has been desired.

SUMMARY OF THE INVENTION

An object of the present invention is to eliminate the above-mentioned drawbacks.

Another object of the present invention is to provide an improvement on the image forming apparatus.

Still another object of the present invention is to provide an image forming apparatus capable of image reproduction with a high image quality.

Still another object of the present invention is to provide an image forming apparatus capable of image reproduction with a high image quality and a high speed.

The foregoing and still other objects of the present invention, and the advantages thereof, will become fully apparent from the following description to be taken in conjunction with the attached drawings and from the appended claims.

DETAILED DESCRIPTION OF THE PREFERRED EMBODIMENTS

Now the present invention will be clarified in detail by embodiments thereof shown in the attached drawings.

[Principle of laser beam control (FIGS. 2 and 3)]

Figure 2:
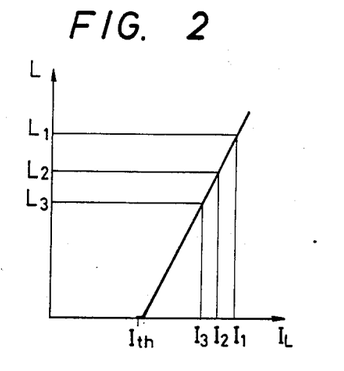
FIG. 2 is a chart showing the relation between the current and the light intensity from a light-emitting diode.
Figure 3:
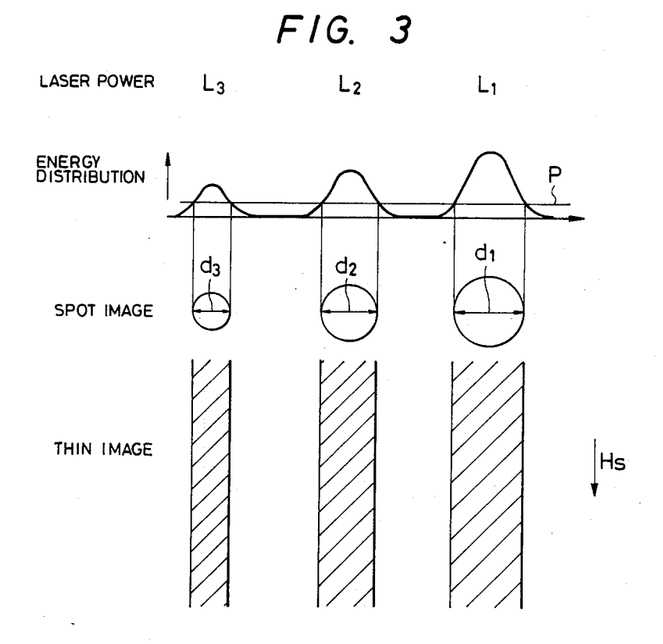
FIG. 3 is a schematic view showing the width control of a thin line by the laser beam intensity.

At first reference is made to FIGS. 2 and 3 for explaining the possibility of controlling the width of a thin line parallel to the laser scanning direction Hs through the control of laser beam intensity.

FIG. 2 shows the light emission characteristic of a semiconductor laser (laser diode), indicating the laser beam intensity (or light quantity) in the ordinate as a function of the current in the abscissa. There is obtained a laser beam intensity $L_1$, $L_2$ or $L_3$ respectively at a current $I_1$, $I_2$ or $I_3$. The current and the laser beam intensity are almost linearly correlated, and this line defines a threshold current $I_{th}$ at $L=0$. There is practically no light emission from the laser until the current exceeds the threshold value.

FIG. 3 shows energy distributions of latent images obtained by irradiating the photosensitive member with laser beam intensities $L_1$, $L_2$ and $L_3$, and the latent images provide image diameters $d_1$, $d_2$ and $d_3$ when developed with a development threshold value P, in the same manner as if the diameter of the laser beam spot is varied. Thus thin lines of different widths $d_1$, $d_2$ and $d_3$ can be obtained by scanning with such laser beams in the direction Hs. Though the foregoing explanation is based on the image scan process, it is naturally possible, also in the background scan process, to control the line width through the control of laser beam intensity.

[Laser beam control process (FIGS. 1, 4 to 7L)]

Figure 1:
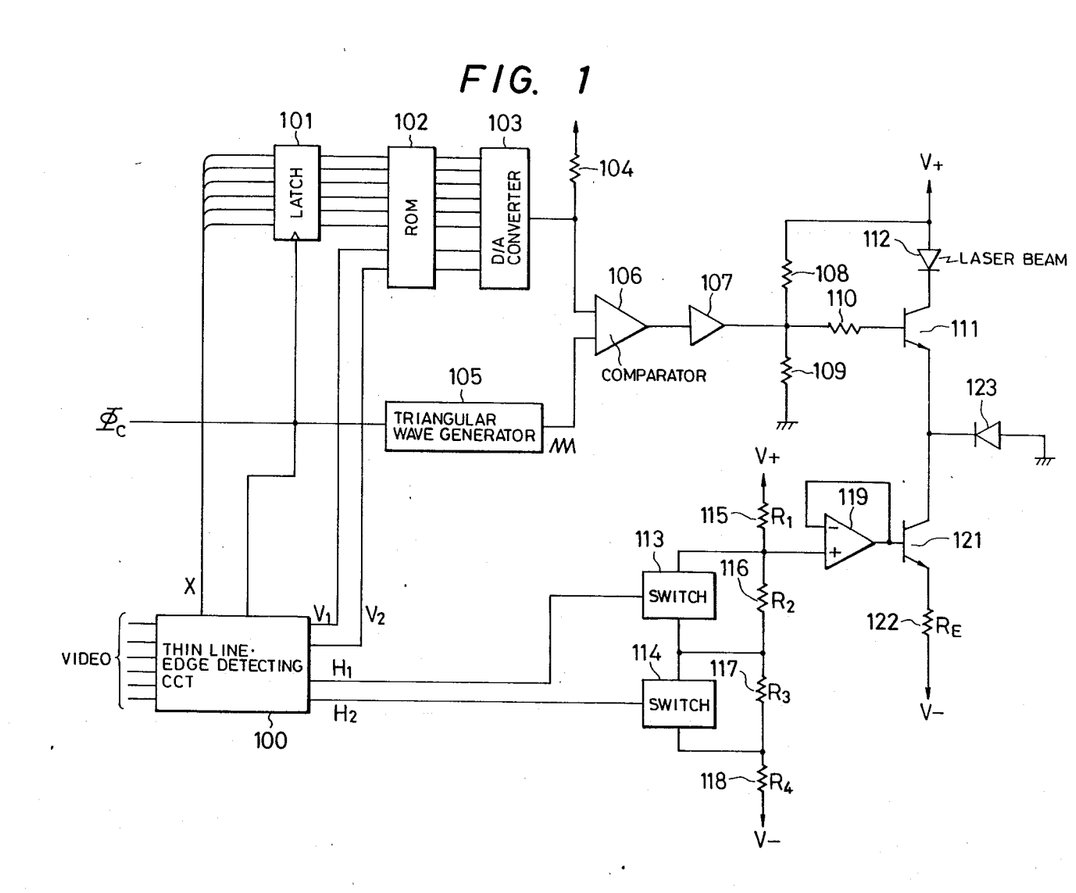
FIG. 1 is a circuit diagram of a laser beam control circuit constituting an embodiment of the present invention.

FIG. 1 is a circuit diagram of a laser beam control unit constituting an embodiment of the present invention.

An image signal VIDEO is supplied to a thin line/edge detecting circuit 100 including a delay circuit. In the present embodiment the signal VIDEO is a 6-bit digital signal with tonal levels of 6 bits.

Figure 4:
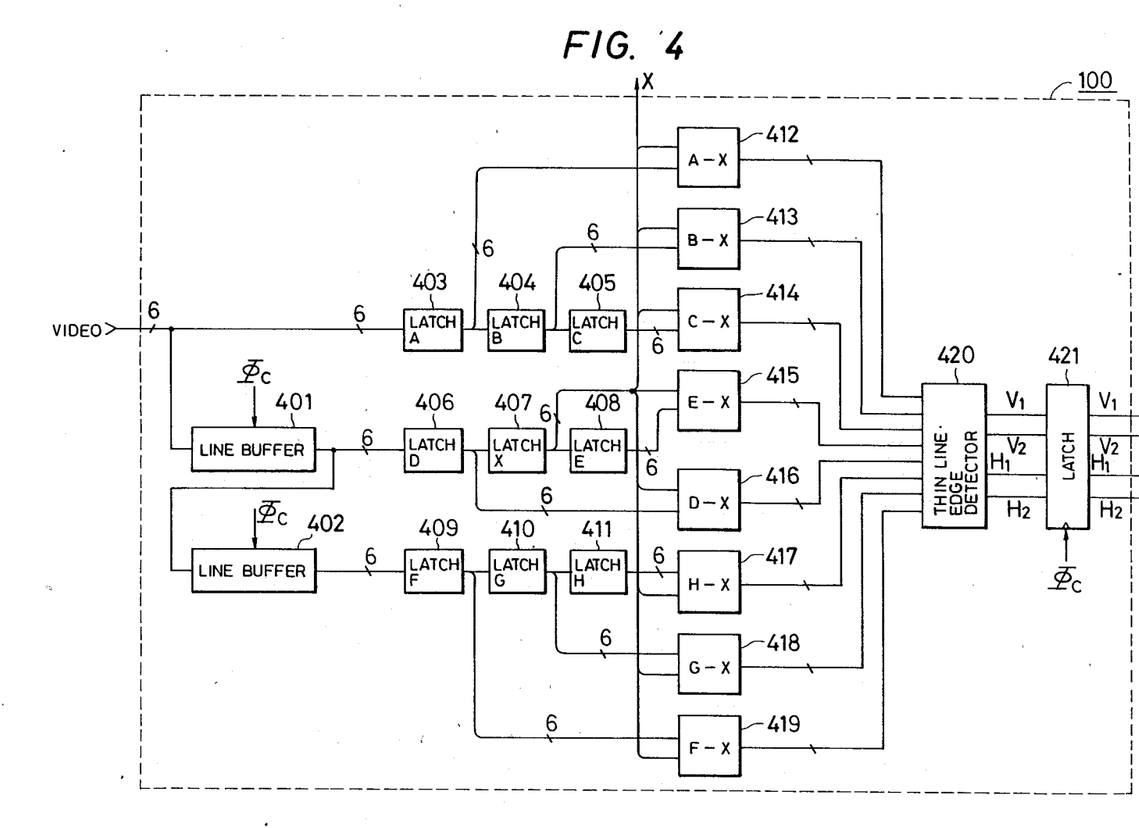
FIG. 4 is a block diagram of a thin line/edge detecting circuit.

In the following there will be explained said thin line/edge detecting circuit 100, details of which are shown in FIG. 4.

The 6-bit image signal VIDEO is latched in a latch 403 with a delay corresponding to one pixel, and further delayed by one pixel in each of latches 404, 405.

Image signal VIDEO is also supplied to a line buffer latch 401, capable of storing pixel data of a line, and delayed by one line. The output of said line buffer 401 is supplied to another line buffer 402 and further delayed by one line. The pixel data from the line buffers 401, 402 are delayed by a pixel in each of latches 406-408 and 409-411. The buffers 401, 402 and latches 403-411 are synchronized with a pixel clock signal $\phi_c$.

When a pixel X latched in the latch 407 is considered as a target pixel to be irradiated with the laser beam on the photosensitive member, a pixel E in the latch 408 is a pixel which has been irradiated immediately before, while pixels F, G, H in the latched 409-411 are those in a preceding line, and pixels A, B, C in the latches 403-405 are those in a succeeding line.

Figure 5:
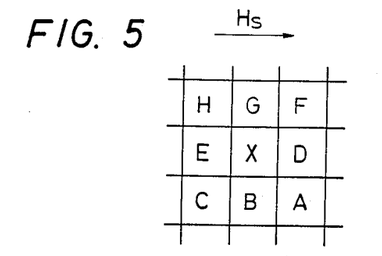
FIG. 5 is a view of a matrix of a target pixel and neighboring pixels.

Thus the pixels A-H in the latches 403-406 and 408-411 constitute neighboring pixels of the target pixel X, with an actual arrangement upon recording operation as shown in FIG. 5.

Difference discriminating circuits 412-419 respectively determine the absolute values of the differences between the tonality level of the target pixel X and the tonality levels of the neighboring pixels A-H in the latches 403-406 and 408-411, and provide a thin line-/edge detector 420 with the results of discrimination whether the differences exceed a predetermined threshold value. The difference discriminators 412-419 can be easily realized with a memory device such as ROM. More specifically it is possible to use the signals lines of the target pixel X and the neighboring pixels A-H as address lines of a ROM, to effect the calculation of difference and comparison with the threshold value for all the combinations of the addresses, and to store the resulting data at the corresponding addresses.

The output of each of difference discriminator 412-419 is composed of two bits, of which one bit indicates whether the difference exceeds the threshold value, while the other bit indicates the level is higher or lower than that of the target pixel, or the sign of the difference.

The thin line/edge detector 420 discriminates, based on the outputs of difference discriminators 412-419, whether the target pixel is in a fine line or at an edge.

FIGS. 6A to 6L illustrate condition patterns indicating that the target pixel X is in a black (relative to the surrounding area) edge or a black fine line.

Figure 6A:
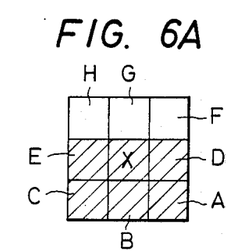
FIGS. 6A to 6L are views showing conditions of detecting a black edge or a black thin line.

FIG. 6A indicates a state where the target pixel X (at the center of 3×3 matrix) is identified to be present at an edge parallel to the laser scanning direction. In this state the pixels A to E are at approximately same levels, so that the difference discriminators 412-416 provide signals indicating that the difference is smaller than the threshold value. On the other hand, the difference discriminators 417-419 indicate that the pixels F-H have level differences, with respect to the target pixel X, exceeding the threshold value, and that pixels F-H are identified as being below the level of a white pixel in comparison with the target pixel X. A combination of such discriminations identifies that the target pixel X is on a horizontal edge.

Figure 6B:
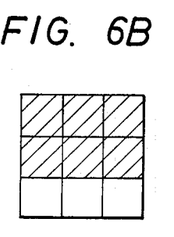
Figure 6C:
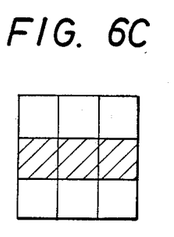
Figure 6D:
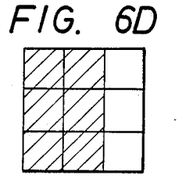
Figure 6E:
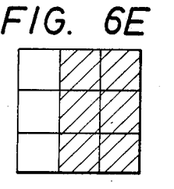
Figure 6F:
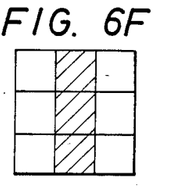
Figure 6G:
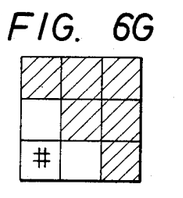
Figure 6H:
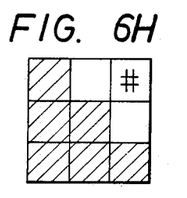
Figure 6I:
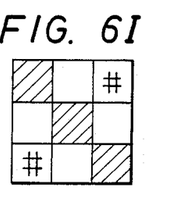
Figure 6J:
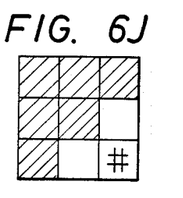
Figure 6K:
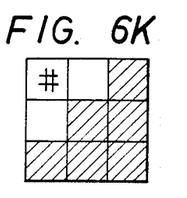
Figure 6L:
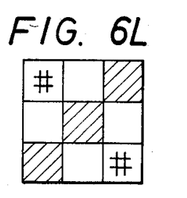

Similarly FIG. 6B indicates a condition for identification that the target pixel X is on a horizontal black edge, and FIG. 6C indicates a condition for the presence of the target pixel on a horizontal black fine line. Also FIGS. 6D and 6E show cases in which the target pixel is present on a black edge perpendicular to the scanning direction, and FIG. 6F shows a case in which the target pixel is present on a vertical black fine line. FIGS. 6G, 6H, 6J, 6K show conditions that the target pixel is on a diagonal black edge, and FIGS. 6I and 6L show conditions that the target pixel is on a diagonal black fine line.

In these drawings, the pixels marked "#" need not be considered in the discrimination.

FIGS. 7A to 7L illustrate conditions indicating that the target pixel X is on a white (relative to the surrounding area) edge or a white fine line.

Figure 7A:
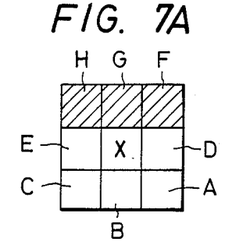
FIGS. 7A to 7L are views showing conditions of detecting a white edge or a white thin line.
Figure 7B:
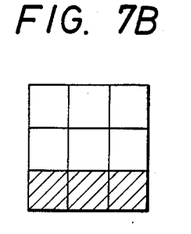
Figure 7C:
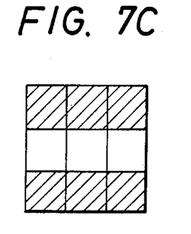
Figure 7D:
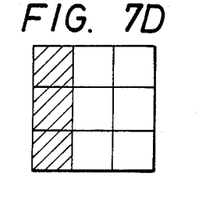
Figure 7E:
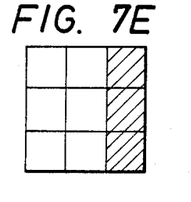
Figure 7F:
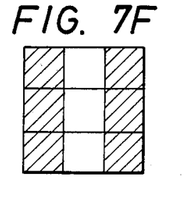
Figure 7G:
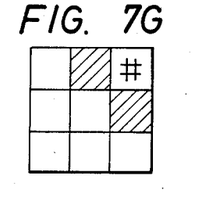
Figure 7H:
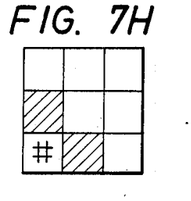
Figure 7I:
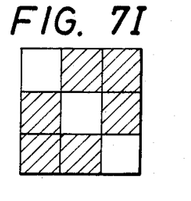
Figure 7J:
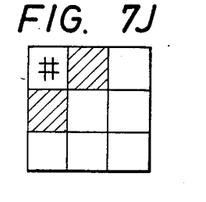
Figure 7K:
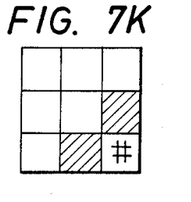
Figure 7L:
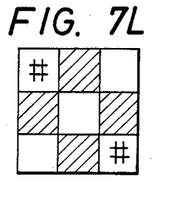

FIG. 7A indicates a state where the target pixel X is identified to be present at an edge parallel to the laser scanning direction. In this state the pixels A to E are identified to be at approximately same levels, and the difference discriminators 412-416 provide signals indicating that the difference is smaller than the threshold value. On the other hand the difference discriminators 417-419 provide signals indicating that the pixels F-H are identified as being near a black level with respect to the target pixel X, with differences exceeding the threshold value. A combination of such discriminations identifies that the target pixel is on a horizontal white edge. Similarly FIG. 7B shows a condition that the target pixel X is on a horizontal white edge, and FIG. 7C shows a condition that the target pixel X is on a horizontal white line. FIGS. 6D and 6E show conditions that the target pixel X is on a vertical white edge to the laser scanning direction, and FIG. 6F shows a condition that it is on a vertical white line. FIGS. 6G, 6H, 6J and 6K show conditions that the target pixel X is on a diagonal white edge, and FIGS. 6I and 6L show a condition that it is on a diagonal white fine line. In these drawings, the pixels marked # need not be considered in the discrimination.

In response to these conditions, the thin line/edge detector 420 provides signals $V_1$, $V_2$, $H_1$ and $H_2$ summarized in the following table:

| Input | Detector Output | | | | Result of identification |
|---|---|---|---|---|---|
| | $H_1$ | $H_2$ | $V_1$ | $V_2$ | |
| (A) - (C) | 1 | 1 | 0 | 0 | horizontal fine line or edge |
| (D) - (F) | 0 | 0 | 1 | 1 | vertical fine line or edge |
| (G) - (L) | 1 | 0 | 1 | 0 | diagonal fine line or edge |
| others | 0 | 0 | 0 | 0 | |

The signals $H_1$ and $H_2$ are used for controlling the laser beam intensity while the signals $V_1$ and $V_2$ are used for controlling the pulse width of the laser beam. Thin line/edge detector 420 can also be realized with a memory device such as a ROM. More specifically it is possible to use the output signals of the difference discriminators 412-419 as the address signals and to store the corresponding output signals. The output of the fine line/edge detector 420 is synchronized, in a latch 421, with the image clock signal $\phi_c$.

Figure 8A:
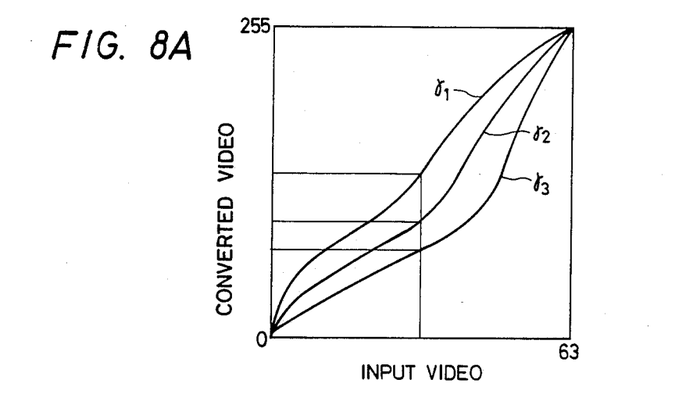
FIGS. 8A and 8B are charts showing image signal conversion characteristics for pulse width modulation.
Figure 8B:
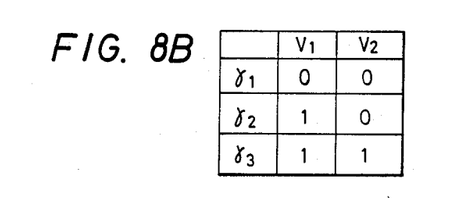

[Laser beam control operation (FIGS. 1 and 8)]

Now reference is made to FIG. 1 showing a laser modulating circuit for controlling the intensity and turn-on time of the laser beam according to the result of identification explained above.

The image signal of the target pixel X is supplied from the thin line/edge detector 100 and is synchronized, in a latch 101, with the image clock signal $\phi_c$ for achieving synchronization with the detection signals $V_1$, $V_2$, $H_1$ and $H_2$. The output signal of latch 101 is supplied to an address line of a converter ROM 102, of which remaining two address lines receive the detection signals $V_1$, $V_2$ from the fine line/edge detector 100. The ROM 102 stores conversion data tables $\gamma_1-\gamma_3$, as shown in FIG. 8A, corresponding to the address signals. Thus the input video signal is converted according to a table $\gamma_1$, $\gamma_2$ or $\gamma_3$ respectively when the address signals ($V_1$, $V_2$) are (0, 0) (1, 0) or (1, 1). The converted video signal is then converted into a signal of a pulse width corresponding to the signal level, according to the principle already explained in relation to FIG. 12, by means of a D/A converter 103, a resistor 104, a triangular wave generator 105 and a comparator 106.

The pulse-width modulated signal from the comparator 106 is supplied through a buffer 107 to terminator resistors 108, 109 for voltage compensation, and is further supplied through a base resistor 110 to a switching transistor 111. An H-level pulse-width modulated signal (corresponding to black in the image scan process or white in the background scan process) turns on the transistor 111, and an L-level signal turns off the transistor 111. When transistor 111 is turned on, the current I of a constant current source constituted by a transistor 121 is supplied to a laser diode 112, thus activating the laser during a period corresponding to the pulse width. On the other hand, when the transistor 111 is turned off, the current I flows through a diode 123 so that the laser remains deactivated.

As already explained in relation to FIG. 2, the light intensity from the laser diode 112 depends on the current I flowing in the laser diode 112. The current I is governed by, and can therefore be regulated by the base potential of the transistor 121. The base potential is determined by a voltage $V_R$, obtained by dividing the voltage difference between $V_+$ and $V_-$ with resistors and supplied to the transistor 121 after an impedance conversion with a voltage follower composed of an operational amplifier 119.

In the present embodiment, the base potential $V_R$ of the transistor 121 is given by voltage division with four resistors $R_1$, $R_2$, $R_3$ and $R_4$, so that the laser is turned on with a current I determined by:

$$V_R = V_- + \frac{(V_+ - V_-) \times (R_2 + R_3 + R_4)}{(R_1 + R_2 + R_3 + R_4)}$$

Current I can be represented by:

$$I = (V_R - V_{BE} - V_-)/R_E$$

wherein $R_E$ is the emitter resistance of the transistor 121, AND $V_{BE}$ is the base-emitter voltage thereof. The laser beam intensity in this state is defined as $L_1$. Analog switches 113 and 114 are connected respectively parallel to the resistors $R_2$ and $R_3$, and are respectively turned on or off in the state "1" or "0" of the control signals $H_1$ and $H_2$.

In the state "1" of the control signal $H_1$, the analog switch 113 is turned on or closed to short circuit the resistor $R_2$ to obtain a voltage $V_R$ $$V_R = V_- + \frac{(V_+ - V_-) \times (R_3 + R_4)}{(R_1 + R_3 + R_4)}$$

Consequently the current I is reduced to provide a lowered intensity $L_2$ from the laser diode 112. Then, when the control signal $H_2$ assumes a state "1", the analog switch 114 is closed to short circuit the resistor $R_3$ to provide a voltage $V_R$:

$$V_R = V_- + \frac{(V_+ - V_-) \times R_4}{(R_1 + R_4)}$$

so that the current I is further reduced to provide a further reduced intensity $L_3$ from the laser diode 113.

When the target pixel X is identified not on an edge nor on a fine line, the detection signals $H_1$, $H_2$, $V_1$ and $V_2$ assume values 0, 0, 0, 0 to open the analog switches 113, 114 whereby the laser emits the beam with an intensity $L_1$. On the other hand, the curve $\gamma_1$ is selected in the ROM 102 of the pulse-width modulating circuit, corresponding to a normal state.

On the other hand, if the target pixel X is identified to be present on an edge or a fine line parallel to the laser scanning direction, the detection signals $H_1$, $H_2$, $V_1$, $V_2$ assume values 1, 1, 0, 0 to close the analog switches 113, 114, whereby the intensity of the laser beam is reduced to $L_3$. It is therefore rendered possible to correct, in the image scan process, the widening of a black fine line or the thinning of a white fine line parallel to the laser scanning direction, or, in the background scan process, the widening of a white fine line or the thinning of a black fine line parallel to the laser scanning direction.

If the target pixel X is identified to be present on an edge or a fine line perpendicular to the laser scanning direction, the detection signals $H_1$, $H_2$, $V_1$, $V_2$ assume values 0, 0, 1, 1. As the analog switches 113, 114 remain open, the laser beam intensity remains at the level $L_1$, but a conversion curve $\gamma_3$ is selected from the ROM 102 of the pulse width modulating circuit. Thus the level of the target pixel X, though same as in the preceding cases, is converted to a smaller value than in the case of the curve $\gamma_1$, so that the duration of the pulse-width modulated signal is reduced.

In this manner it is rendered possible to correct, in the image scan process, the widening of a black fine line or the thinning of a white fine line perpendicular to the laser scanning direction, or, in the background scan process, the widening of a white fine line or the thinning of a black fine line perpendicular to the laser scanning direction.

If the target pixel X is identified to be present on a diagonal edge or fine line, the detection signals $H_1$, $H_2$, $V_1$, $V_2$ assume values 1, 0, 1, 0 to close the analog switch 113 but to maintain the analog switch 114 in the open state, whereby the laser beam intensity assumes a level $L_2$ between $L_1$ and $L_3$. In the pulse width modulating circuit, a conversion curve $\gamma_2$ is selected from the ROM 102, whereby the duration of the pulse-width modulated signal is shorter than in the case of curve $\gamma_1$ but longer than in the case of curve $\gamma_3$. In this manner the laser beam intensity and the turn-on time are both reduced to correct, in the image scan process, the widening of a diagonal black fine line or the thinning of a diagonal white fine line, or, in the background scan process, the widening of a diagonal white fine line or the thinning of a diagonal black fine line.

As explained in the foregoing, the present embodiment allows for effectively preventing the thinning or widening of a fine line, by detecting whether a target pixel is positioned on a fine line or an edge, from the relation of said target pixel and neighboring pixels and controlling the diameter of a light spot irradiating the photosensitive member by means of the intensity of the laser beam and the duration thereof, according to the result of said detection.

It is also rendered possible to uniformly present the widening or thinning of a fine line of an arbitrary angle, by detecting the angle of a fine line or an edge with respect to the laser scanning direction at the same time and controlling the laser beam intensity and the laser turn-on period according to thus detected angle, and thus to obtain a laser beam printer capable of image reproduction with high image quality.

In the present embodiment, in case of image scan process, if the target pixel is identified to be present on a black edge or a black fine line, control is conducted to reduce the laser beam intensity and/or the pulse width, but no control is effected on the white edge or fine line. However, in case of image scan process, if the target pixel is identified as white present on a white edge or a white fine line but not at the absolutely white level, control may be effected to reduce the laser beam intensity and/or the pulse width to achieve more effective prevention for the thinning or widening of a fine line.

Similarly, in case of background scan process, of the target pixel is identified to be present on a black edge or a black fine line but is not at the absolutely black level, control may be similarly effected to reduce the laser beam intensity and/or the pulse width to effectively prevent the thinning of a black fine line or the widening of a white fine line.

In the present embodiment there is employed a 3×3 matrix for detecting a fine line or an edge, but a larger matrix may be employed to achieve more exact detection and to enable detection of different angles in addition to 0°, 45°, 90° and 135°. A more effective prevention of the thinning or widening of a fine line by increasing the number of laser control levels or the number of conversion curves in the ROM 102 to increase the number of levels of the current I, in response to the number of detectable angles, and adopting a suitable combination of these control values according to the detected angle.

Although the foregoing description is limited to the laser beam printer, the principle of the foregoing embodiment can also be applied to similar drawbacks in other printers such as a wire dot matrix printer, capable of producing different densities for each pixel.

The present invention is not limited to the foregoing embodiment but is subject to various modifications and variations within the scope and spirit of the appended claims.

I claim:

1. An image forming apparatus comprising:
   digital image signal input means;
   image forming means for forming an image for each of predetermined elements by scanning a recording medium in response to the digital image signal entered through said input means, said image forming means being capable of scanning said recording medium in first and second scanning directions for image formation,
   said image forming means including means for forming a pulse-width modulated signal on the basis of the level of the digital image signal entered through said input means; and
   means for correcting the size of at least one of the predetermined elements formed on said recording medium in first and second modes in relation to the first and second scanning directions, said first and second modes being different from each other, wherein in said first mode said correcting means corrects the pulse width of the pulse-width modulated signal.

2. An image forming apparatus according to claim 1, further comprising discriminating means for discriminating whether the digital image signal entered through said input means represents a thin line image or an edge image, wherein said correcting means corrects the size of the predetermined elements at plural steps in accordance with the discrimination result produced by said discrimination means.

3. An image forming apparatus according to claim 2, wherein said correcting means includes a plurality of tables, wherein said correcting means receives the digital image signal entered through said input means, converts the characteristics of the digital image signal based on one of said plurality of tables, and selects one of the tables in accordance with the result produced by said discriminating means, and wherein the converted digital image signal output from said correcting means is supplied to said image forming means.

4. An image forming apparatus according to claim 3, wherein said image forming means comprises:
   means for generating a recording beam for scanning the recording medium, wherein said pulse-width modulated signal forming means forms the pulse-width modulated signal on the basis of the converted digital image signal; and
   modulating means for modulating the recording beam on the basis of the pulse-width modulated signal.

5. An image forming apparatus according to claim 4, wherein said correcting means further comprises means for selecting a value of a drive current applied to said recording beam generating means to change the intensity of the recording beam in accordance with the discrimination result produced by said discrimination means.

6. An image forming apparatus according to claim 2, wherein said discriminating means performs discrimination of the digital image signal entered for each pixel of the digital image signal, and wherein each of the predetermined elements formed on the recording medium corresponds to a pixel, and wherein the size of the predetermined elements change on the basis of a level of the input digital image signal.

7. A beam recording apparatus comprising:
   digital image signal input means;
   means for generating a recording beam to irradiate a recording medium for image formation;
   modulating means for modulating the recording beam in response to the digital image signal entered from said input means,
   wherein said modulating means includes means for forming a pulse-width modulated signal in accordance with the level of the digital image signal entered through said input means, and for modulating the recording beam on the basis of the pulse-width modulated signal; and
   correcting means for correcting the intensity of said recording beam and the irradiation duration thereof.

8. A beam recording apparatus according to claim 7, wherein said correcting means includes converting means for converting characteristics of the digital image signal entered through said input means in accordance with a table and for outputting the converted digital image signal, and wherein said converting means includes a plurality of tables employed in the conversion of the characteristics of the input digital image signal, one of the plurality of tables being selectively used, and wherein the converted digital image signal converted by a selected one of the plurality of tables and output from said converting means is supplied to said modulating means to modulate the recording beam.

9. A beam recording apparatus according to claim 8, wherein said correcting means includes means for selecting a value of a drive current applied to said recording beam generating means to change the intensity of said recording beam.

10. A beam recording apparatus according to claim 9, further comprising means for discriminating whether the digital image signal entered through said input means represents a thin line image or an edge image, and wherein said correcting means selects a value of the drive current and one of the tables in accordance with the discrimination result produced by said discriminating means.

11. A beam recording apparatus according to claim 8 wherein said PWM signal forming means forms the pulse-width modulated signal on the basis of a level of the converted digital image signal, and modulating the recording beam on the basis of the pulse-width modulated signal.

12. An image forming apparatus according to claim 2, wherein said discriminating means performs a discrimination operation thereof in association with at least the first and second scanning directions.

13. A beam recording apparatus according to claim 7, wherein said correcting means corrects the pulse-width of the pulse-width modulated signal to correct the irradiation duration of the recording beam.

14. An image processing apparatus comprising:
digital image signal input means;
conversion means for converting characteristics of the digital image signal entered through said input means and for outputting the converted digital image signal, said converting means including a plurality of tables employed to convert the characteristics of the input digital image signal;
processing means for processing the converted digital image signal output from said converting means and for generating a pulse-width modulated signal on the basis of the level of the converted digital image signal; and
discriminating means for discriminating image contents of the input digital image signal, said discriminating means selecting one of the plurality of tables to be used in the conversion in accordance with the discrimination result.

15. An image processing apparatus according to claim 14, further comprising beam generating means for generating a beam to irradiate a recording medium for image formation, and modulating means for modulating the beam on the basis of the pulse-width modulated signal.

16. An image processing apparatus according to claim 15, further comprising selecting means for selecting a value of a drive current applied to said beam generating means to change the intensity of the beam, said selecting means performing a selecting operation thereof in accordance with the discrimination result produced by said discriminating means.

17. An image processing apparatus according to claim 14, wherein said discriminating means includes memory means for storing a plurality of pixels of the digital image signal entered for each pixel, and performs a discrimination operation thereof on the basis of the contents stored in said memory means.

18. An image processing apparatus according to claim 17, wherein said discriminating means discriminates whether the digital image signal represents a thin or edge image or not in association with plural directions.

19. A beam recording apparatus according to claim 10, wherein said discriminating means discriminates whether the digital image signal represents a thin or edge image or not in association with plural directions.

* * * * *